United States Patent
Killadi et al.

(10) Patent No.: US 10,931,516 B2
(45) Date of Patent: Feb. 23, 2021

(54) NETWORK LINK FAILURE DETECTION

(71) Applicant: Hewlett Packard Enterprise Development LP, Houston, TX (US)

(72) Inventors: Srinivas Rao Killadi, Bangalore (IN); Shravan Kumar Vuggrala, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 102 days.

(21) Appl. No.: 16/142,085

(22) Filed: Sep. 26, 2018

(65) Prior Publication Data
US 2020/0099577 A1    Mar. 26, 2020

(51) Int. Cl.
*H04L 12/26*    (2006.01)
*H04L 12/24*    (2006.01)
*H04L 12/751*   (2013.01)

(52) U.S. Cl.
CPC ........ *H04L 41/0677* (2013.01); *H04L 43/045* (2013.01); *H04L 43/0864* (2013.01); *H04L 45/026* (2013.01)

(58) Field of Classification Search
None
See application file for complete search history.

(56) References Cited

U.S. PATENT DOCUMENTS

| | | | |
|---|---|---|---|
| 8,065,419 B2 | 11/2011 | Vimpari et al. | |
| 8,713,097 B2 | 4/2014 | Wu | |
| 8,830,868 B2 | 9/2014 | Vedantham et al. | |
| 8,892,710 B2 | 11/2014 | Gatta et al. | |
| 9,258,234 B1 | 2/2016 | Addepalli et al. | |
| 9,609,040 B2 * | 3/2017 | Tun | H04L 65/608 |
| 9,826,319 B2 * | 11/2017 | Kunzle | H04R 25/356 |
| 2009/0129777 A1 * | 5/2009 | Singh | H04L 43/0852 398/58 |
| 2010/0150243 A1 * | 6/2010 | Kure | H03M 13/373 375/240.24 |
| 2013/0258853 A1 * | 10/2013 | Sindhu | H04L 47/10 370/235 |

(Continued)

OTHER PUBLICATIONS

Microsoft, Things That You May Want to Know About TCP Keepalives, Jun. 3, 2010, pp. 1-6, Retrieved from the Internet on Aug. 23, 2018 URL: <blogs.technet.microsoft.com/nettracer/2010/06/03/things-that-you-may-want-to-know-about-tcp-keepalives/ >.

*Primary Examiner* — Phirin Sam
(74) *Attorney, Agent, or Firm* — Hewlett Packard Enterprise Patent Department

(57) ABSTRACT

Some examples relate to detecting network link failure. In an example, a determination may be made at a first network device on a network regarding an average round-trip delay time (RTD) between the first network device and a second network device over a given time interval during a given period of time. Then, for the given time interval, a keepalive packet may be sent from the first network device to the second network device at the average RTD of the given time interval for a keepalive time. In response to a determination, by the first network device that there is no acknowledgement of the keepalive packet from the second network device during the keepalive time, a network link between the first network device and the second network device may be identified as failed.

19 Claims, 6 Drawing Sheets

(56) References Cited

U.S. PATENT DOCUMENTS

| | | | |
|---|---|---|---|
| 2014/0164641 A1* | 6/2014 | Ye | H04L 47/127 709/235 |
| 2014/0226984 A1* | 8/2014 | Roberts | H04B 10/27 398/66 |
| 2016/0295295 A1* | 10/2016 | Dixit | H04L 65/4084 |

* cited by examiner

NETWORK LINK FAILURE DETECTION

BACKGROUND

Computer networks may form a significant part of an organization's data communication infrastructure. One of the aspects that may be considered while designing a computer network is failure detection. Failure detection is a desirable component of network management. A data communication failure in a computer network may occur, for instance, due to failure of a network node (for example, a router) or link between two nodes

BRIEF DESCRIPTION OF THE DRAWINGS

For a better understanding of the solution, examples will now be described, with reference to the accompanying drawings, in which.

DETAILED DESCRIPTION

Network devices may use a keepalive message mechanism for failure detection in a network. Keepalive messages may be sent at predefined intervals. After a keepalive message is sent, if no reply is received the link is assumed to be down and future data may be routed via another path until the link is up again. This process may typically involve a few seconds. In case of some applications, such a delay before fault detection may be too slow.

The existing mechanisms to detect a network link's status between two network devices may use the same amount of time to determine the connectivity status irrespective of the type of the link between the two devices. For instance, in an existing approach, keepalive messages may be sent every 10 seconds for a minute, thus taking a minute to decide if a link is dead or not. This may not be an ideal scenario since the nature of the link is not taken into consideration. For example, a Long-Term Evolution (LTE) link may have a higher round-trip delay time (RID) value, whereas a Digital subscriber line (DSL) may have a lower RTD value.

The present disclosure describes various examples for detecting network link failure. In an example, a determination may be made at a first network device regarding an average round-trip delay time (RID) between the first network device and a second network device over a given time interval during a given period of time. Then, for the given time interval, a keepalive packet may be sent from the first network device to the second network device at the average RID of the given time interval for a keepalive time. In response to a determination, by the first network device that, there is no acknowledgement of the keepalive packet from the second network device during the keepalive time, a network link between the first network device and the second network device may be identified as failed.

Instead of using static means for determining a link's health, the proposed solution uses historical data to determine an ideal waiting time prior to declaring a link as dead. The proposed solution is adaptive in nature, and much faster than a hardcoded time value (for example, one minute). The proposed solution does not rely on a fixed keepalive message retry interval, but rather adopts an adaptive approach based on historical data. This improves the functioning of the system by increasing the compatibility of the system with a number of applications that stop properly functioning when a link is broken and traditional methods of detection are employed.

Figure 1:
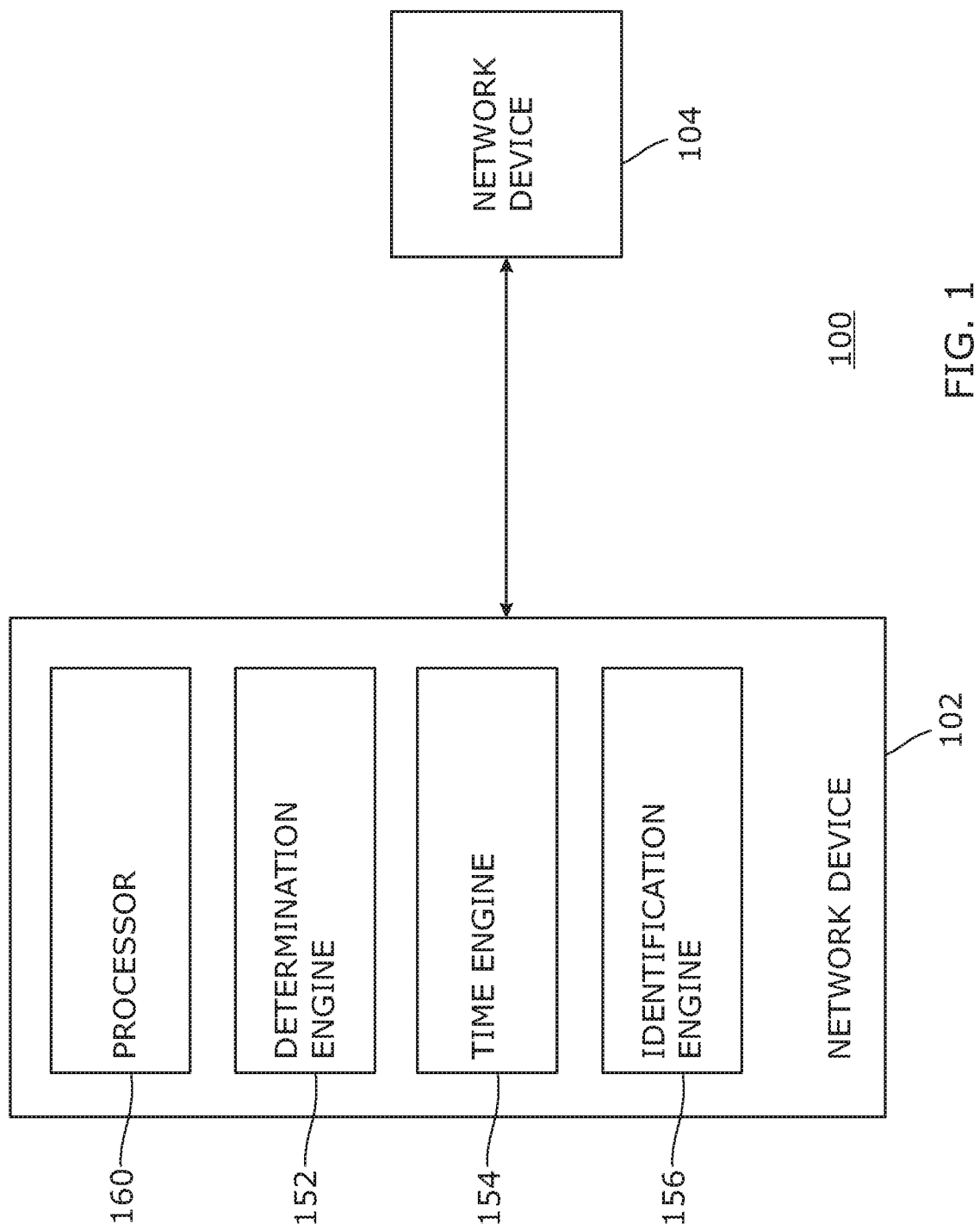
FIG. 1 is a block diagram of an example computing environment for detecting network link failure.

FIG. 1 is a block diagram of an example computing environment 100 for detecting network link failure. In an example, computing environment 100 may include network devices 102 and 104. Although only two network devices (102 and 104) are shown in FIG. 1, other examples of this disclosure may include more than two network devices.

Network device 102 and 104 may be communicatively coupled over a computer network. The computer network may be a wireless or wired network. The computer network may include, for example, a Local Area Network (LAN), a Wide Area Network (WAN), a Metropolitan Area Network (MAN), a Storage Area Network (SAN), a Campus Area Network (CAN), or the like. Further, the computer network may be a public network (for example, the Internet) or a private network.

In an example, network devices 102 and 104 may be communicatively coupled via a physical medium such as, for instance, a twisted-pair cable, a coaxial cable, and a fiber optic cable.

Network devices 102 and 104 may each be, for example, a network router, a network switch, a virtual switch, a virtual router, a VPN concentrator (VPNC) and a virtual internet gateway, or any other network device that is capable of performing routing and/or switching-related functions. Network devices 102 and 104 may each be a branch office controller. In an example, the branch office controller may located at a branch office of an enterprise. A VPN concentrator may provide a secure creation of VPN connections and delivery of messages between VPN nodes.

In an example, network devices 102 and 104 may each be a gateway node. Examples of a gateway node may include a VPNC and Virtual Internet Gateway (VIG). In an example, network devices 102 and 104 may each be a branch node. An example of a branch node may include a branch office controller. The aforementioned node classification may be based on the role of IPsec tunnels on a node. If a node has Primary/Secondary load balanced IPsec tunnels, it may be classified as a branch node, else the node may be referred to as a gateway node. Internet Protocol Security (IPsec) is a network protocol suite that authenticates and encrypts the packets of data sent over a network. IPsec, for example, may extend private networks through creation of encrypted tunnels which secure site to site connectivity across untrusted networks. IPsec can protect data flows between a pair of hosts, between a pair of security gateways, or between a security gateway and a host. An IPsec tunnel may allow encrypted IP traffic to be exchanged between the participating entities. In an example, a link between network devices 102 and 104 may include an IPsec connection.

In an example, network device 102 may include a determination engine 152, a time engine 154, an identification engine 156, and a processor 160. For the sake of simplicity in illustration, network device 102 is shown to include determination engine 152, time engine 154, and identification engine 156. However, any of the other network devices in the computing environment 100, for example, network device 104 could include these engines.

Network device 102 may be implemented by at least one computing device and may include at least engines 152, 154, and 156 which may be any combination of hardware and programming to implement the functionalities of the engines described herein. In examples described herein, such combinations of hardware and programming may be implemented in a number of different ways. For example, the programming for the engines may be processor executable instructions stored on at least one non-transitory machine-readable storage medium and the hardware for the engines may include at least one processing resource (for example, processor 160) to execute those instructions. In some examples, the hardware may also include other electronic circuitry to at least partially implement at least one engine of network device 102. In some examples, the at least one machine-readable storage medium may store instructions that, when executed by the at least one processing resource, at least partially implement some or all engines of the computing device. In such examples, network device 102 may include the at least one machine-readable storage medium storing the instructions and the at least one processing resource (for example, processor 160) to execute the instructions.

In an example, determination engine 152 may determine an average round-trip delay time (RTD) between network device (or "first network device") 102 and a second network device (for example, 104) over a given time interval during a given period of time. A RTD includes the length of time it takes for a signal to be sent plus the length of time it takes for an acknowledgement of that signal to be received. This time delay includes the propagation times for the paths between the two communication endpoints. In an example, the signal may include a network or data packet.

A given time interval may vary, for example, from a second(s) to a minute(s). In an example, a given time interval may be one minute. A given period of time may vary, for example, from an hour(s) to a year(s). In an example, the given period of time may be 24 hours. In another example, the given period of time may be one month.

In an example, an "average" round-trip delay time (RTD) between network device 102 and second network device 104 may be determined by determining a RTD between network device 102 and second network device 104 at given sub-intervals of a given time interval. A given sub-interval may vary, for example, from a second(s) to a minute(s). In an example, if a given time interval is one minute, given sub-intervals may be ten seconds each. In this case, an actual RTD between network device 102 and second network device may be determined every ten seconds, and an average of six RTDs may be determined over a given one minute time interval. The same process may be repeated for a given time period, for example, 24 hours. This becomes the "average" RTD between network device 102 and second network device 104 over a given one minute time interval over a given 24-hour time period.

Figure 2:
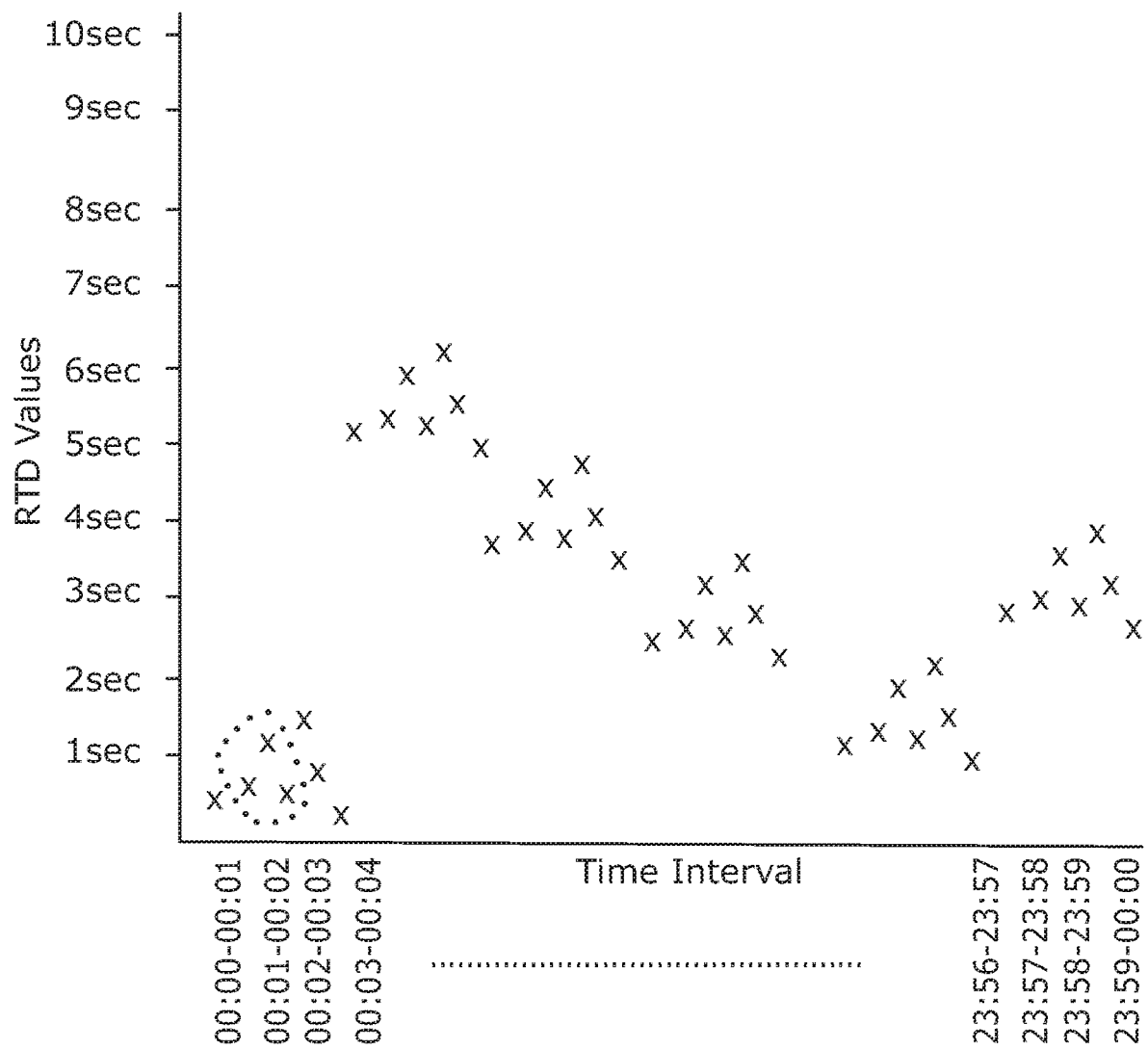
FIG. 2 is an example graph illustrating round-trip delay time (RTD) values over a given time interval.

The average RTD between network device 102 and second network device 104 over a given interval for a given period of time may be stored, for example, on network devices 102 and/or 104. The average RTD between network device 102 and second network device 104 over a given interval for a given period of time may be plotted, for example, in a graph, which may be displayed on a display device. FIG. 2 illustrates an example graph 200 that plots average RTD values between network device 102 and second network device 104 against time intervals of one minute.

Figure 3:
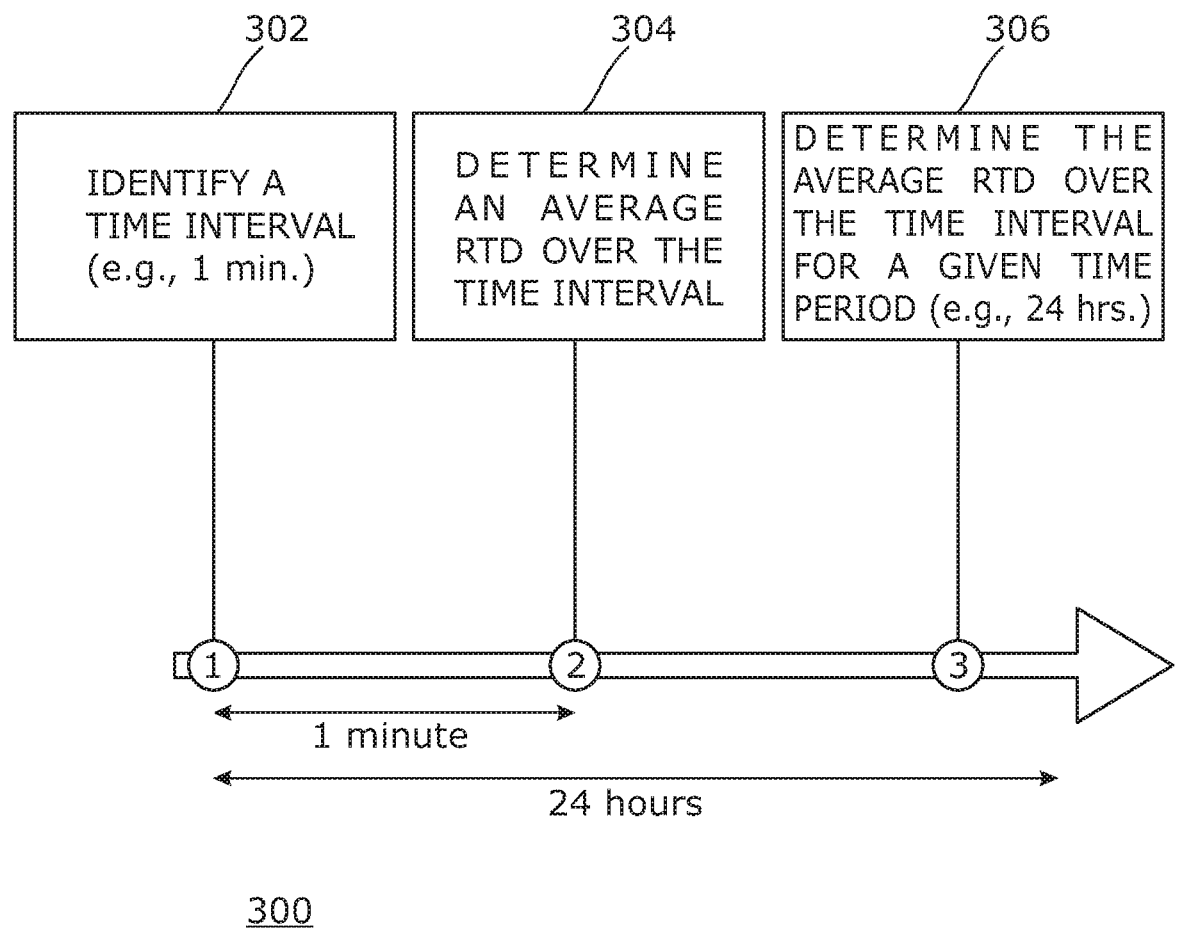
FIG. 3 illustrates an example timeline of events.

In an example, determination engine 152 may determine an average RTD between first network device 102 and second network device 104 over one minute intervals for 24 hours. FIG. 3 illustrates an example timeline 300 that shows identification of a time interval (e.g., one minute) for determining an average RTD 302; determination of an average RTD over the identified time interval 304; and determination of an average RTD over the identified time interval 304 for a five time period (e.g., 24 hours) 306. In another example, determination engine 152 may determine an average RTD between first network device 102 and second network device 104 over one minute intervals for a month.

In an example, in the event a determination is to be made whether a link between network device 102 and second network device 104 has failed during a given time interval (for example, between time 23:56 and 23:57), time engine 154 may send a keepalive packet(s) to second network device 104 at the average RTD of the given time interval for a keepalive time. Referring to FIG. 2, the average RTD for the given time interval between time 23:56 and 23:57 is 1 second. In this case, time engine 154 may send a keepalive packet(s) to second network device 104 at 1 second intervals for a keepalive time. In an example, the keepalive time may include a multiple of the average RTD and a pre-defined value (Keepalive time=average RTD*pre-defined value). The pre-defined value may indicate a number of times a keepalive packet(s) is/are sent. Thus, for example, if the pre-defined value is 5, time engine may send a keepalive packet(s) at 1 second intervals for five times.

In response to a determination that there is no acknowledgement of the keepalive packet from second network device 104 during the keepalive time, identification engine 156 may identify a network link between network device 102 and second network device 104 as failed.

Figure 4:
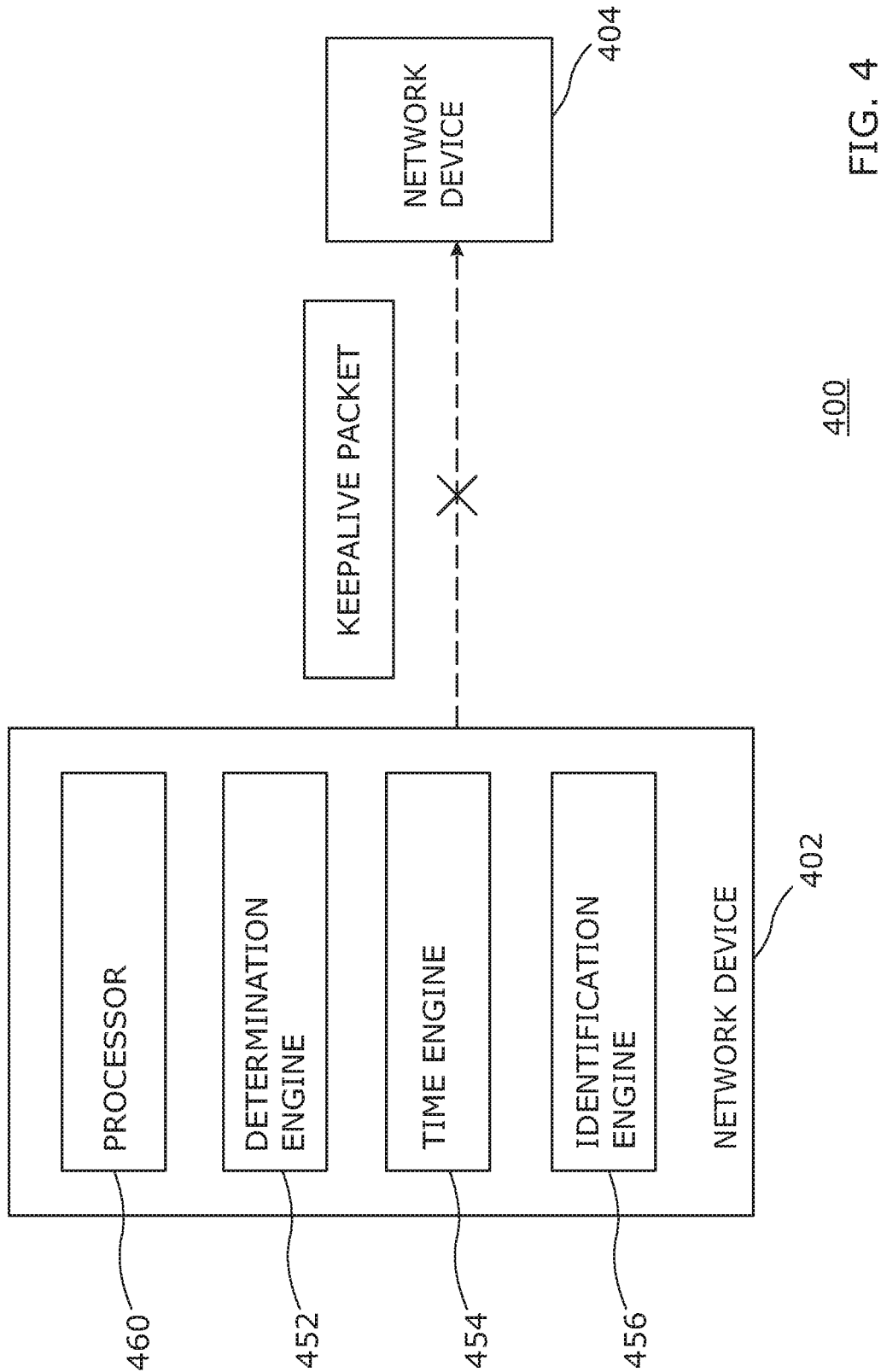
FIG. 4 is a block diagram of an example network device for detecting network link failure.

FIG. 4 is a block diagram of an example network device 402 for detecting network link failure. In an example, network device 402 may be analogous to network device 102 or 104 of FIG. 1, in which like reference numerals correspond to the same or similar, though perhaps not identical, components. For the sake of brevity, components or reference numerals of FIG. 4 having a same or similarly described function in FIG. 1 are not being described in detail in connection with FIG. 4. Said components or reference numerals may be considered alike.

In an example, network device 402 may include a determination engine 452, a time engine 454, an identification engine 456, and processor 460. In an example, determination engine 452, time engine 454, and identification engine 456 may perform functionalities similar to those described earlier in reference to determination engine 152, time engine 154, and identification engine 156 of FIG. 1, respectively.

In an example, determination engine 452 may determine an average round-trip delay time (RTD) between network device 402 and a second network device 404 over a given time interval during a given period of time. In an example, for the given time interval, time engine 454 may send a keepalive packet to the second network device 404 at the average RTD of the given time interval for a keepalive time. In response to a determination that there is no acknowledgement of the keepalive packet from the second network device 404 during the keepalive time, identification engine 456 may identify a network link between network device 402 and the second network device 404 as failed.

Figure 5:
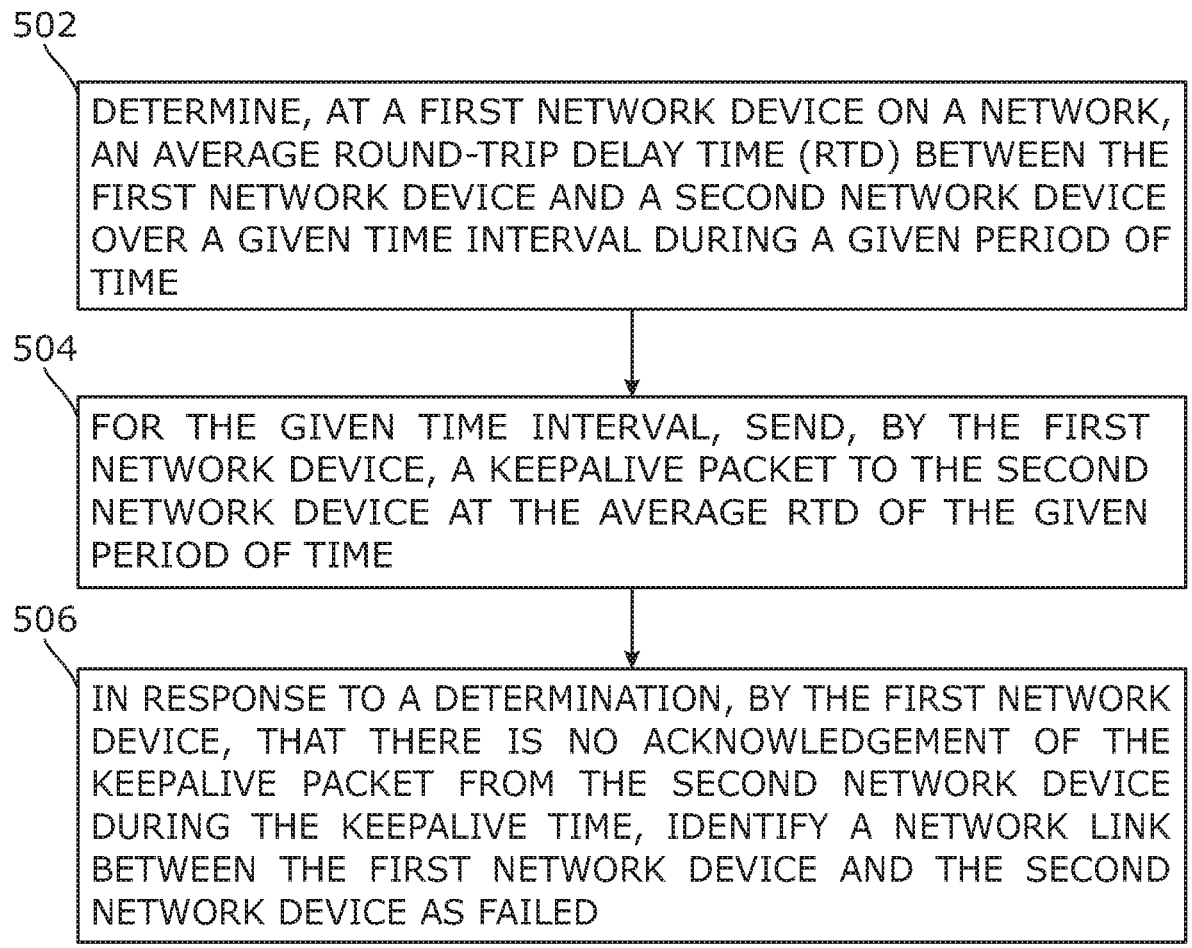
FIG. 5 is a block diagram of an example method of detecting network link failure.

FIG. 5 is a block diagram of an example method 500 of detecting network link failure. The method 500, which is described below, may be executed on a network device such as network device 102 or 104 of FIG. 1, or 402 of FIG. 4. However, other devices may be used as well.

At block 502, a determination may be made at a first network device on a network regarding an average round-trip delay time (RTD) between the first network device and a second network device over a given time interval during a given period of time. In an example, the network may include a software-defined Wide Area Network (SD-WAN). At block 504, for the given time interval, a determination may be made whether a network link between the first network device and the second network device has failed. In an example, the determination may comprise sending, at the given time interval, by the first network device, a keepalive packet to the second network device at the average RTD of the given time interval for a keepalive time. At block 506, in response to a determination, by the first network device that there is no acknowledgement of the keepalive packet from the second network device during the keepalive time, a network link between the first network device and the second network device may be identified as failed.

Figure 6:
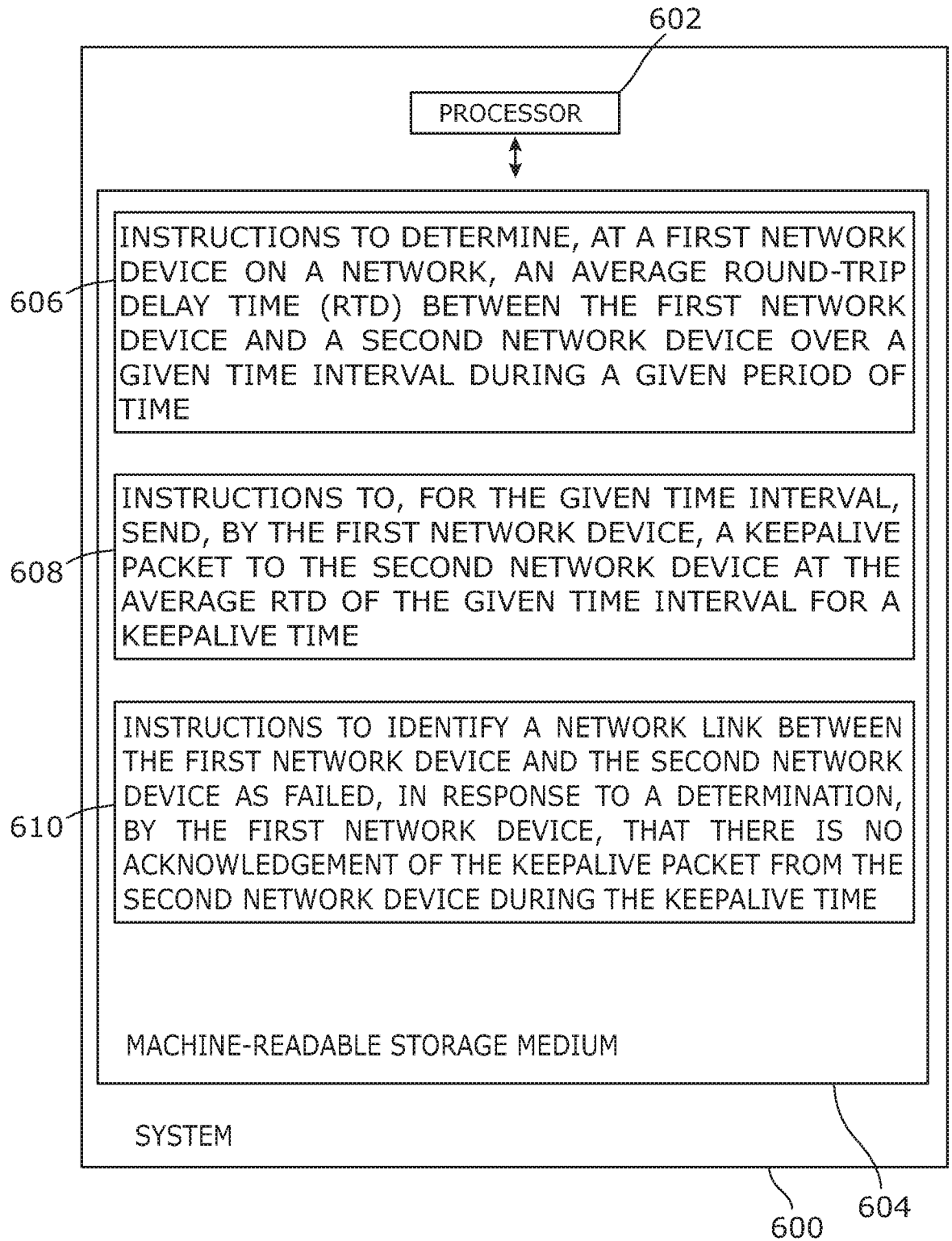
FIG. 6 is a block diagram of an example system including instructions in a machine-readable storage medium for detecting network link failure.

FIG. 6 is a block diagram of an example system 600 including instructions in a machine-readable storage medium for detecting network link failure.

System 600 includes a processor 602 and a machine-readable storage medium 604 communicatively coupled through a system bus. Processor 602 may be any type of Central Processing Unit (CPU), microprocessor, or processing logic that interprets and executes machine-readable instructions stored in machine-readable storage medium 604. Machine-readable storage medium 604 may be a random access memory (RAM) or another type of dynamic storage device that may store information and machine-readable instructions that may be executed by processor 602. For example, machine-readable storage medium 604 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In some examples, machine-readable storage medium 604 may be a non-transitory machine-readable medium. In some examples, machine-readable storage medium 604 may be remote but accessible to system 600.

Machine-readable storage medium 604 may store instructions 606, 608, and 610. In some examples, instructions 606 may be executed by processor 602 to determine, at a first network device on a network, an average round-trip delay time (RTD) between the first network device and a second network device over a given time interval during a given period of time. Instructions 608 may be executed by processor 602 to send, for the given time interval, by the first network device, a keepalive packet to the second network device at the average RTD of the given time interval for a keepalive time. Instructions 610 may be executed by processor 602 to identify, in response to a determination, by the first network device, that there is no acknowledgement of the keepalive packet from the second network device during the keepalive time, a network link between the first network device and the second network device as failed.

For the purpose of simplicity of explanation, the example method of FIG. 5 is shown as executing serially, however it is to be understood and appreciated that the present and other examples are not limited by the illustrated order. The example systems of FIGS. 1, 4, and 6, and method of FIG. 5 may be implemented in the form of a computer program product including computer-executable instructions, such as program code, which may be run on any suitable computing device in conjunction with a suitable operating system (for example, Microsoft Windows®, Linux®, UNIX and the like). Examples within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It should be understood that the above-described examples of the present solution is for the purpose of illustration only. Although the solution has been described in conjunction with a specific example thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The invention claimed is:

1. A method of network link failure detection, comprising:
   determining, at a first network device on a network, an average round-trip delay time (RTD) between the first network device and a second network device over a given time interval for a given period of time, wherein determining the average RTD comprises determining a RTD between the first network device and the second network device at given sub-intervals of the given time interval; and
   for the given time interval, determining whether a network link between the first network device and the second network device has failed, wherein determining comprises:
   at the given time interval, sending, by the first network device, a keepalive packet to the second network device at the average RTD of the given time interval for a keepalive time; and
   in response to a determination, by the first network device, that there is no acknowledgement of the keepalive packet from the second network device during the keepalive time, identifying a network link between the first network device and the second network device as failed.

2. The method of claim 1, wherein the given sub-intervals include ten seconds.

3. The method of claim 1, further comprising storing the average RTD between the first network device and the second network device over the given interval.

4. The method of claim 1, wherein determining the average RTD between the first network device and the second network device over the given time interval for the given period of time comprises determining the average RTD between the first network device and the second network device over one minute intervals for 24 hours.

5. The method of claim 1, wherein determining the average RTD between the first network device and the second network device over the given time interval for the given period of time comprises determining the average RTD between the first network device and the second network device over one minute intervals for one month.

6. The method of claim 1, plotting the average RTD against the given time interval in a graph.

7. The method of claim 1, wherein the network includes a software-defined Wide Area Network (SD-WAN).

8. A network device, comprising:
 a determination engine to determine an average round-trip delay time (RTD) between the network device and a second network device over a given time interval during a given period of time, wherein determination of the average RTD comprises determining a RTD between the first network device and the second network device at given sub-intervals of the given time interval;
 a time engine to, for the given time interval, send a keepalive packet to the second network device at the average RTD of the given time interval for a keepalive time; and
 an identification engine to, in response to a determination that there is no acknowledgement of the keepalive packet from the second network device during the keepalive time, identify a network link between the network device and the second network device as failed.

9. The network device of claim 8, wherein the link includes an Internet Protocol Security (IPsec) connection.

10. The network device of claim 8, wherein the keepalive time includes a multiple of the average RTD and a predefined value.

11. The network device of claim 10, wherein the predefined value is five.

12. The network device of claim 8, wherein the given time interval is one minute.

13. The network device of claim 8, wherein the given period of time is one month.

14. A non-transitory machine-readable storage medium comprising instructions, the instructions executable by a processor to:
 determine, at a first network device on a network, an average round-trip delay time (RTD) between the first network device and a second network device over a given time interval during a given period of time, wherein determination of the average RTD comprises determining a RTD between the first network device and the second network device at given sub-intervals of the given time interval;
 for the given time interval, send, by the first network device, a keepalive packet to the second network device at the average RTD of the given time interval for a keepalive time; and
 in response to a determination, by the first network device, that there is no acknowledgement of the keepalive packet from the second network device during the keepalive time, identify a network link between the first network device and the second network device as failed.

15. The storage medium of claim 14, wherein the second network device includes a branch controller.

16. The storage medium of claim 14, wherein the first network device includes a Virtual Private Network concentrator (VPNC).

17. The storage medium of claim 14, wherein the given period of time is 24 hours.

18. The storage medium of claim 14, wherein the first network device includes a router.

19. The storage medium of claim 14, further comprising instructions to display the average RTD against the given time interval.

* * * * *